United States Patent

Sezai

[19]

[11] Patent Number: 5,852,420
[45] Date of Patent: Dec. 22, 1998

[54] ANTENNA DEVICE

[75] Inventor: Toshihiro Sezai, Tokyo, Japan

[73] Assignee: National Space Development Agency of Japan, Tokyo, Japan

[21] Appl. No.: 39,819

[22] Filed: Mar. 30, 1993

[30] Foreign Application Priority Data

Apr. 28, 1992 [JP] Japan ........................ 4-134448

[51] Int. Cl.⁶ .................... G01S 3/16; G01S 5/04
[52] U.S. Cl. .................. 342/382; 342/442; 342/424
[58] Field of Search .................... 342/378, 379, 342/382, 422, 423, 424, 442, 430, 445

[56] References Cited

U.S. PATENT DOCUMENTS

| | | | |
|---|---|---|---|
| 2,990,544 | 6/1961 | La Rosa | 342/382 |
| 3,154,778 | 10/1964 | Kock | 342/382 |
| 4,888,593 | 12/1989 | Friedman et al. | 342/382 |
| 5,021,793 | 6/1991 | Stangel et al. | |

FOREIGN PATENT DOCUMENTS 0 358 342 A1  3/1990  European Pat. Off. .
0 532 201 A1  3/1993  European Pat. Off. .

OTHER PUBLICATIONS

European Search Report, dated Oct. 18, 1993.

*Primary Examiner*—Gregory C. Issing
*Attorney, Agent, or Firm*—Armstrong, Westerman, Hattori, McLeland & Naughton

[57] ABSTRACT

An antenna system is made up by a main antenna and a sub antenna which is adjacent the main antenna in a direction not perpendicular to the direction of beam scan of the main antenna and which has a beam axis coincident with a beam axis of the main antenna. Antenna beams of the antenna system are scanned by a scan device. Received signals of both the antennas are subjected to a multiplication process under phase coherent condition in a phase-coherent multiplying device. A signal corresponding to a maximum frequency component in the output signal of the phase-coherent multiplying device is output by a frequency discriminating device and then subjected to a signal conversion process in a signal converting device. Information about a radio wave source only in the direction of the antenna beams is thus obtained.

6 Claims, 4 Drawing Sheets

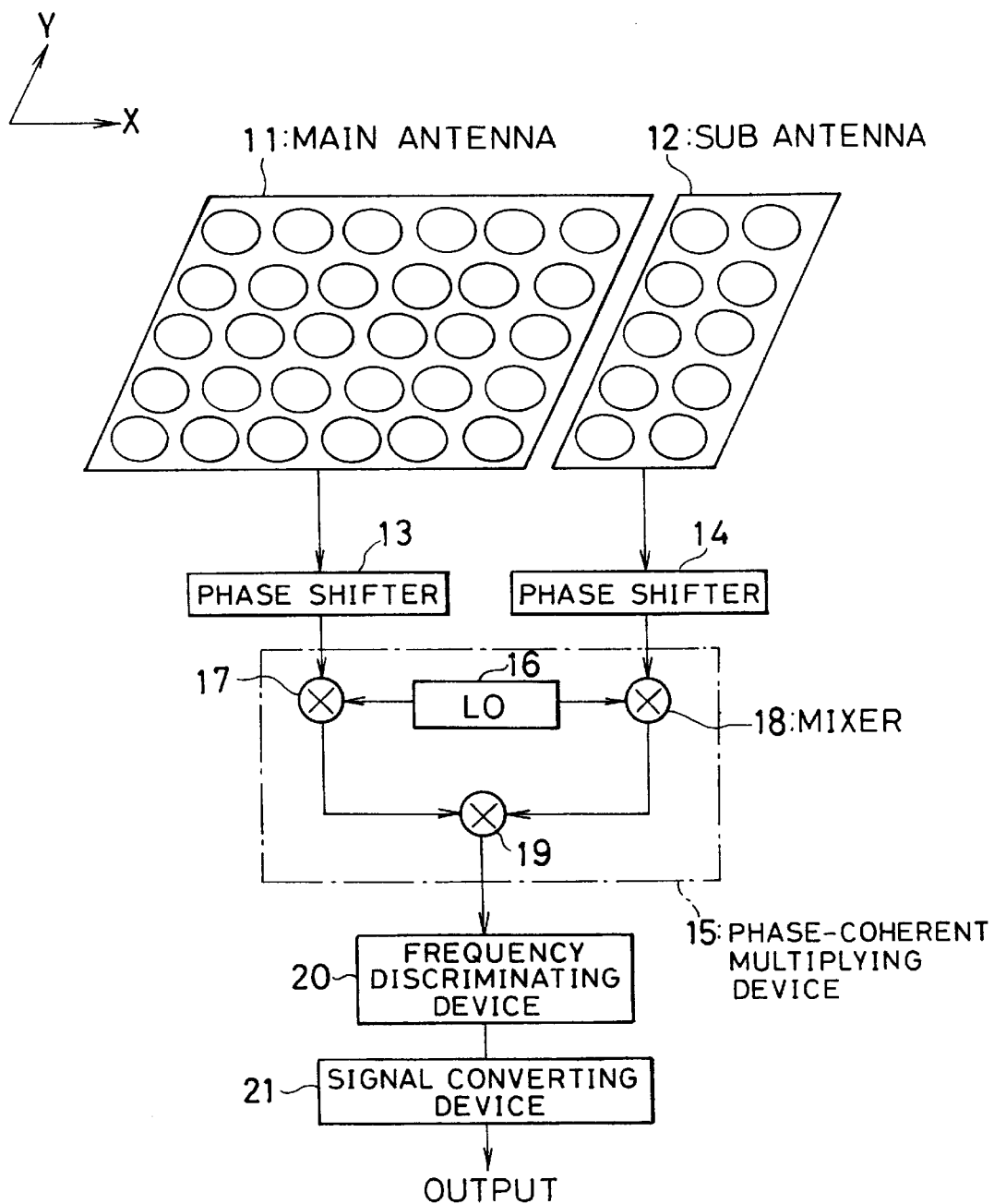

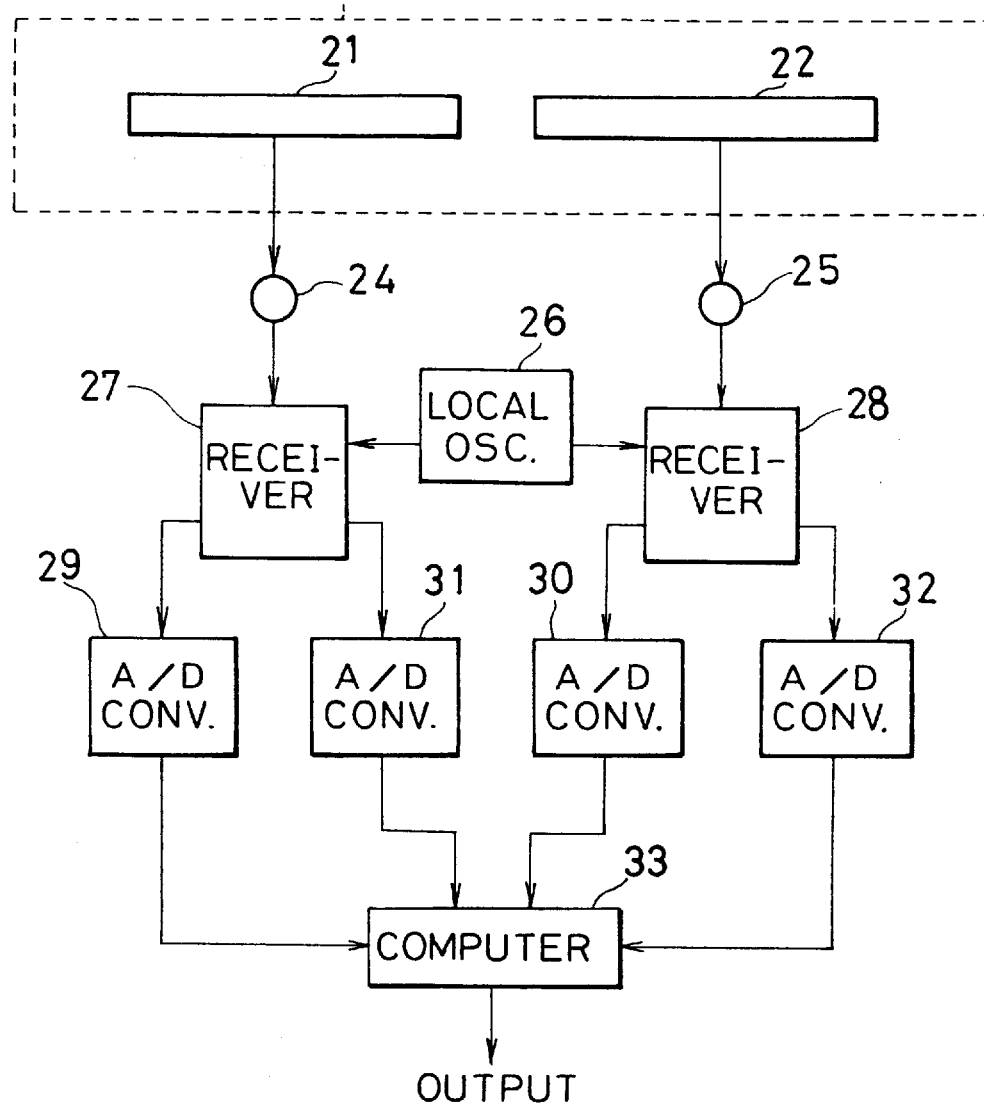

ANTENNA DEVICE

BACKGROUND OF THE INVENTION

1. Field of the Invention

The present invention relates to an antenna device for receiving a radio wave, and more particularly to an antenna device which can precisely extract information about a radio wave source without increasing the size of an antenna.

2. Description of the Related Art

Generally, a beam width and a side lobe level are typical indices representing the quality of antenna patterns of receiving antennas and so forth. The smaller the beam width and the side lobe level, the higher the performance of the antenna. Thus, during reception of radio waves from radio wave sources, the smaller the beam width and the side lobe level, the more a received pattern approaches the distribution of the radio wave sources. Accordingly, an antenna having a beam width of one over infinity and a side lobe level of 0 could produce a received pattern perfectly matched with the distribution of radio wave sources.

As is apparent from electromagnetic field theory, however, it is impossible to realize such an antenna having both a beam width of one over infinity and a side lobe level of 0. Because the beam width is inversely proportional to the antenna length, the beam width can be made very small by making the antenna length very large. It is known that even if the antenna length is so extremely increased, the side lobe level cannot be equal to or smaller than the minimum value defined on the basis of Chebychev's distribution.

During reception of a radio wave by actual antennas, therefore, variations of a radio wave source having a length not larger than the length corresponding to the beam width cannot be detected, and the radio wave is received at the side lobe level, making a detected value different from the true intensity of the radio wave in the beam direction.

While there have been conventionally known several techniques adapted to narrow the beam width or lower the side lobe level, no techniques are yet proposed which can reduce both the beam width and the side lobe level simultaneously, or can realize an effect equivalent to that resulting from a simultaneous reduction in both the indices.

SUMMARY OF THE INVENTION

The present invention is directed to addressing the above problem in conventional antennas, and its object is to provide an antenna device which can precisely extract information about a radio wave source without increasing the size of an antenna.

To achieve the above object, an antenna device of the present invention comprises an antenna system including a main antenna for receiving a radio wave and at least one sub antenna which is adjacent said main antenna in a direction not perpendicular to the direction of beam scan of said main antenna and which has a beam axis coincident with a beam axis of said main antenna; means for scanning antenna beams of said antenna system; means for executing a phase-coherent multiplication processing of received signals of said main antenna and said sub antenna to output a phase term produced depending on the length of a component of the center-to-center spacing between said main antenna and said sub antenna in the direction of beam scan, the wavelength of a received radio wave and the angle of a radio wave source with respect to the direction of the antenna beams; and means for outputting a signal corresponding to a maximum frequency component of frequencies corresponding to time-dependent fluctuations of said phase term output from said means for executing a phase-coherent multiplication process.

In the antenna device thus arranged, by executing the phase-coherent multiplication process of the received signals of the main antenna and the sub antenna, there produces a phase term $\phi$ expressed by the following Equation (1) when the angle of a radio wave source with respect to the direction of antenna beams of the antenna system is $\phi$ (rad), assuming that the length of a component of the center-to-center spacing between the main antenna and the sub antenna in the direction of beam scan is d (m) and the wavelength of a received radio wave is $\lambda$ (m):

$$\phi=(2\pi/\lambda)\cdot d\cdot \sin \theta \qquad (1)$$

A description will now be given of the process of deriving the above Equation (1). As shown in FIG. 1, assuming that the length of a component of the center-to-center spacing between a main antenna a and a sub antenna b in the direction of beam scan is d, the beam direction of an antenna system made up by both the antennas a, b is c, and the direction of a radio wave source is s, a radio wave arriving at the main antenna a from the radio wave source is delayed behind a radio wave arriving at the sub antenna b from the radio wave source by time corresponding to the length L in the illustrated case. In view that the length L is expressed by L=d·sinθ, the Equation (1) is derived by normalizing it with the wavelength $\lambda$ and further multiplying it by $2\pi$ for conversion into units of radians.

Since the antenna beam is to be scanned in the present invention, the angle θ is expressed by the following Equation (2) on a condition that the scan speed is ω (rad/sec) and time is t (sec):

$$\theta=\omega t \qquad (2)$$

Putting Equation (2) into Equation (1) results in the following Equation (3):

$$\phi=(2\pi/\lambda)\cdot d\cdot \sin \omega t \qquad (3)$$

It is thus found that the phase term $\phi$ is a function of time.

When the phase is a function of time, its differential over time corresponds to frequency. The following Equation (4) obtained by differentiating Equation (3) over time represents frequencies corresponding to time-dependent fluctuations of the phase:

$$d\phi/dt=(2\pi/\lambda)\cdot d\cdot \cos \omega t \qquad (4)$$

Putting Equation (2) into Equation (4) results in the following Equation (5):

$$d\phi/dt=(2\pi/\lambda)\cdot d\cdot \omega \cdot \cos \theta \qquad (5)$$

From this Equation (5), it is found that frequency components due to time-dependent fluctuations of the phase term varies depending on the angle θ.

Now consider a case of receiving a radio wave of frequency $\omega_1$. In this case, it is understood that information about the radio wave source in the beam direction of the antenna system, i.e., information about the radio wave source at θ=0, is contained in the frequency expressed by the following Equation (6) derived from Equation (5):

$$\omega_1+(2\pi/\lambda)\cdot d\cdot \omega \cdot \cos 0=\omega_1+(2\pi/\lambda)\cdot d\cdot \omega \qquad (6)$$

It is also understood that information about radio wave sources in directions other than θ=0 is contained in the frequencies expressed by the following Equation (7):

$$\omega_1 + (2\pi/\lambda) \cdot d \cdot \omega \cdot \cos\theta \qquad (7)$$

Accordingly, as with Equation (5), it is found that the received radio wave frequency varies depending on the angle θ.

In theory, therefore, by using the means for outputting a signal corresponding to a maximum frequency component expressed by Equation (7) to thereby select only the radio wave of the frequency expressed by Equation (6) (i.e., maximum one of the fluctuating frequencies), information about the radio wave source only in the direction of antenna beams of the antenna system can be extracted.

BRIEF DESCRIPTION OF THE DRAWINGS

FIG. 4 is a diagrammatic view showing one practical example of the antenna device according to the present invention.

FIG. 5 is a diagrammatic view showing another practical example of the antenna device according to the present invention.

DESCRIPTION OF THE PREFERRED EMBODIMENTS

Figure 1:
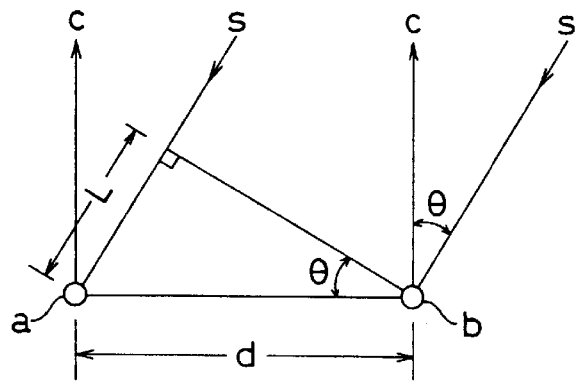
FIG. 1 is an illustration for explaining the occurrence of a phase difference between radio waves arriving at a main antenna and a sub antenna.
Figure 2:
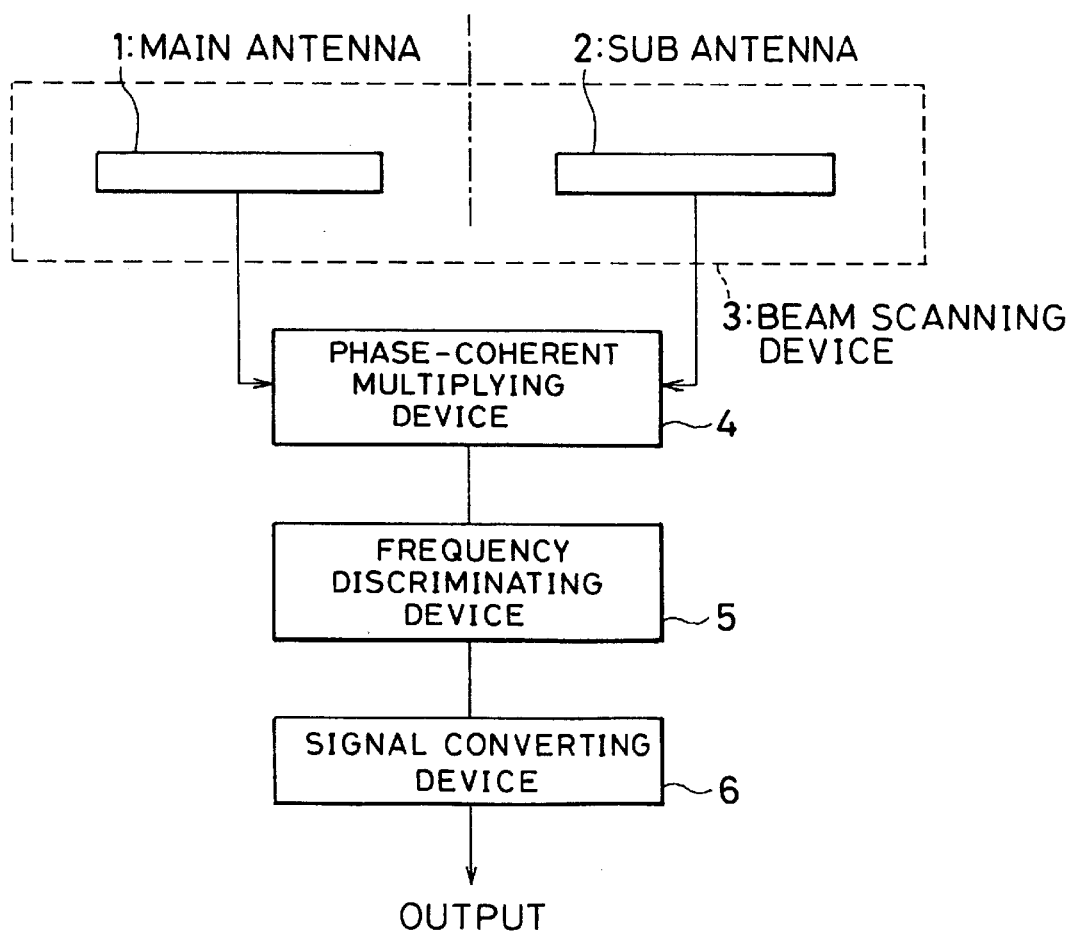
FIG. 2 is a conceptual diagram of the schematic arrangement showing one embodiment of an antenna device according to the present invention.

One embodiment will be described below. FIG. 2 is a conceptual diagram of the schematic arrangement showing one embodiment of an antenna device according to the present invention. In FIG. 2, denoted by reference numeral 1 is a main antenna for receiving a radio wave which may be of any type or size antenna such as a dipole antenna, a horn antenna or an array antenna so long as it can receive a target radio wave. 2 is a sub antenna which may also be of any type or size antenna such as a dipole antenna, a horn antenna or an array antenna. The sub antenna 2 is arranged adjacent the main antenna 1 in a direction not perpendicular to the direction of beam scan of the main antenna 1, and has a beam axis coincident with a beam axis of the main antenna 1. 3 is a beam scanning device such as an antenna rotating device for simultaneously scanning both antenna beams of the main antenna 1 and a sub antenna 2 at a constant speed.

Denoted by 4 is a phase-coherent multiplying device for executing a multiplication process of received high-frequency signals of the main antenna 1 and the sub antenna 2 under a phase coherent condition, and outputting a multiplication process signal which produces a phase term determined depending on the length of a component of the center-to-center spacing between the main antenna 1 and the sub antenna 2 in the direction of the beam scan, the wavelength of a received radio wave and the angle of a radio wave source with respect to the direction of the antenna beams. 5 is a frequency discriminating device for executing a frequency analysis of the signal output from the phase-coherent multiplying device 4, and outputting only a signal corresponding to a maximum frequency component in the analyzed signal. 6 is a signal converting device for converting a unit of the output signal of the frequency discriminating device 5 from [power$^2$] into [power]. It should be noted that when the phase-coherent multiplying device 4 executes a multiplication process of electric fields, the output signal of the frequency discriminating device 5 is obtained in a unit of [power] and, therefore, the signal converting device 6 can be dispensed with.

In the antenna device thus arranged, when a radio wave arrives during the period in which the antenna beams are scanned, the main antenna 1 and the sub antenna 2 output received signals depending on the respective antenna patterns. These outputs are subjected to the multiplication process under a phase coherent condition in the phase-coherent multiplying device 4 and then applied to the frequency discriminating device 5. The frequency discriminating device 5 outputs the received signal corresponding to a maximum frequency component in the applied signal for applying it to the signal converting device 6. As explained in "Summary of the Invention" before, the output signal of the frequency discriminating device 5 contains information about the radio wave source only in the direction of the antenna beams. The signal converting device 6 derives a square root of the signal in units of [power$^2$] resulting from the phase-coherent multiplication process of the received power signal of the main antenna 1 and the received power signal of the sub antenna 2 in the phase-coherent multiplying device 4, followed by outputting the resulting signal as a final output. Note that when the multiplying device 4 executes a multiplication process of received electric field signals, the process executed by the signal converting device 6 is not required.

Figure 3A:
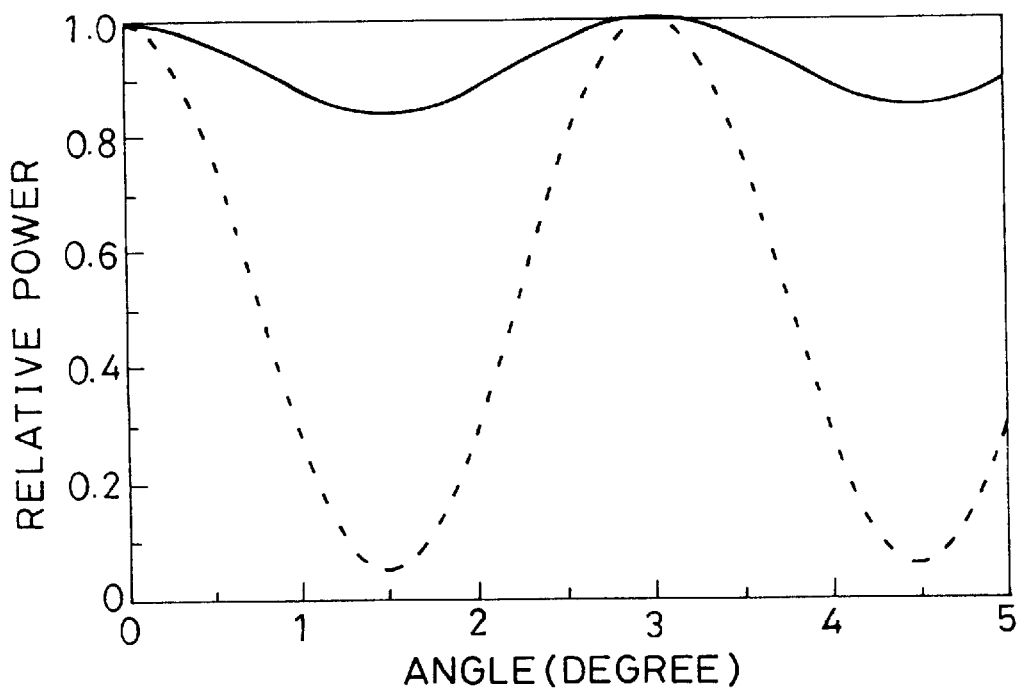
FIGS. 3A and 3B are graphs showing the simulation results of a received power pattern when a main antenna and a sub antenna of the antenna device are assumed as a single antenna and a final received power pattern of the antenna device according to the present invention, respectively.
Figure 3B:
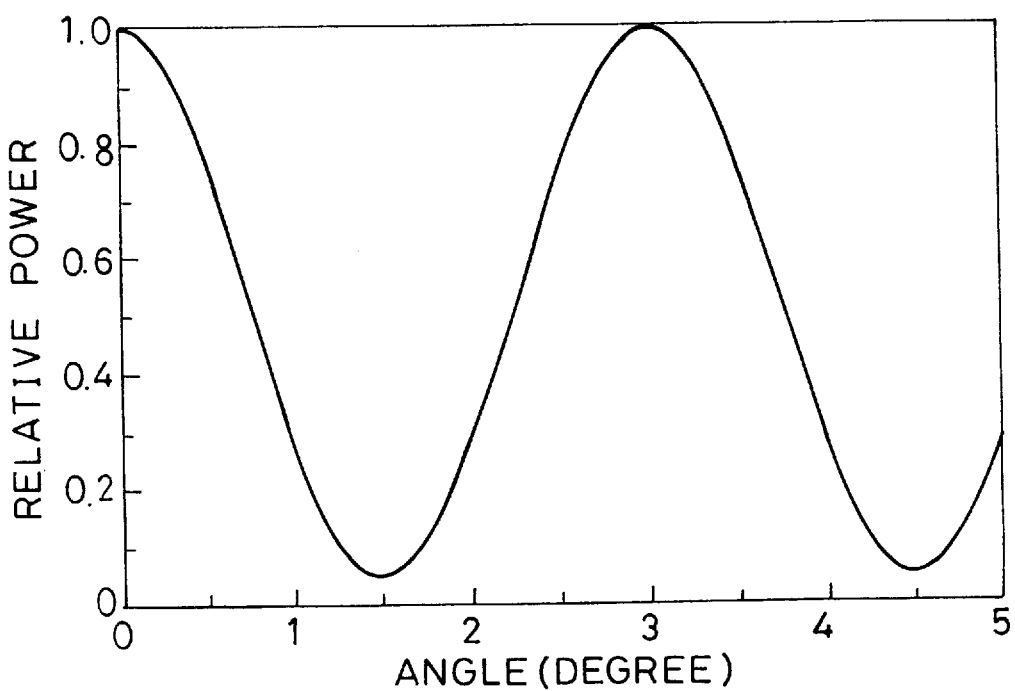

FIGS. 3A and 3B are graphs each showing the simulation result of a received power pattern obtained by scanning the antenna system which is made up of the main antenna 1 comprising a rectangular antenna of uniform distribution with an antenna length in the scan direction being 10 times the received wavelength, and the sub antenna 2 comprising the same rectangular antenna as the main antenna 1, the main antenna 1 and the sub antenna 2 being arranged adjacent each other in the scan direction with the center-to-center interval therebetween set to 10 times the received wavelength, when radio wave sources are present which have constant phase, have an amplitude ranging from 0.1 to 2.1, and fluctuate with a period of 3 degrees. It should be noted that the graphs indicate only the region of + direction because the radio wave sources are laterally symmetrical about 0 degree.

FIG. 3A shows the received power pattern obtained by assuming the main antenna and the sub antenna form a single antenna, i.e., by using a rectangular antenna of uniform distribution with an antenna length in the scan direction being 20 times the received wavelength, and FIG. 3B shows the received power pattern obtained by the antenna device according to the present invention. In the graph of FIG. 3A, a broken line represents a distribution pattern of the radio wave sources. Note that these patterns are plotted with their maximum values set as a reference.

It will be found from the simulation results shown in FIGS. 3A and 3B that the antenna device according to the present invention can provide the received power pattern which matches the distribution pattern of the radio wave sources without being affected by a finite beam width and a side lobe level larger than 0.

Next, one example of the practical arrangement of the antenna device according to the present invention will be described with reference to FIG. 4. In this example, the antenna system is formed with a circular patch array antenna for each of a main antenna 11 and a sub antenna 12. The sub antenna 12 is arranged at a position spaced from the main antenna 11 in the direction of the beam scan, i.e., in the X direction. The antenna beam scanning device is implemented by an electronic scan method using phase shifters 13, 14 for changing the phases of the received signals of the main antenna 11 and the sub antenna 12. A phase-coherent multiplying device 15 is constituted by a local oscillator 16 and mixers 17, 18, 19. A frequency discriminating device 20 may be of an analog or digital configuration. In the case of an analog configuration, a frequency discriminating circuit or a filter can be used to output only the target frequency. In the case of an digital configuration, only the target signal of maximum frequency can be output by converting an output of the mixer 19 to a digital signal by an A/D converter and applying the digital signal to a digital filter or such a process as FFT (Fast Fourier Transform). When the frequency discriminating device 20 is of an analog configuration, a signal converting device 21 can be constituted by an A/D converter and a computer so that an analog output of the frequency discriminating device 20 is converted into a digital signal and this digital signal is subjected to a signal conversion process in the computer. When the frequency discriminating device 20 is of a digital configuration, a signal converting device 21 can be constituted by a computer to execute the signal conversion process therein. The foregoing parts of each device can be all implemented by using known techniques. Note that, as mentioned before, when the multiplying device 15 executes a multiplication process of electric field signals, the signal converting device 21 is not required.

FIG. 5 is a block diagram showing another practical example. In this example, a rotary table 23 for mechanical scan is used as the beam scanning device of the main antenna 21 and the sub antenna 22. Received signals of both the antennas 21, 22 are output through slip rings or rotary joints 24, 25, respectively. Denoted by 26 is a local oscillator for supplying a phase reference signal to receivers 27, 28. The receivers 27, 28 demodulate the signals received by the antennas for outputting the respective amplitudes and phases of the received signals. 29, 30 are A/D converters for converting amplitude signals of the outputs of the receivers 27, 28 from the analog into digital form. 31, 32 are A/D converters for converting phase signals of the outputs of the receivers 27, 28 from analog to digital form. 33 is a computer for executing a phase-coherent multiplication process, an FFT process and then a signal conversion process based on the amplitude signals and the phase signals from the A/D converters 29, 30, 31, 32.

While the above embodiment and examples are illustrated as using a single sub antenna, more than one sub antenna may be provided. Additionally, each of these sub antennas may be of any type antenna such as a dipole antenna, a horn antenna and an array antenna. In the case of using plural sub antennas, received signals of the plural sub antennas are all added together and, thereafter, the phase-coherent multiplication process is executed on the resulting sum and the received signal of the main antenna. In this case, the total received power of the sub antennas is increased, which results in a higher antenna gain and S/N ratio than using the single sub antenna.

According to the present invention, as described above in conjunction with the embodiment, since the antenna device is arranged to output a signal corresponding to a maximum frequency component in the signal output from the means for executing the phase-coherent multiplication process, it is possible to precisely extract information about a radio wave source only in the direction of antenna beams of the antenna system without increasing the antenna size.

What is claimed is:

1. An antenna device comprising:

an antenna system made up by a main antenna for receiving a radio wave and at least one sub antenna which is adjacent said main antenna in a direction not perpendicular to a direction of beam scan of said main antenna and which has a beam axis coincident with a beam axis of said main antenna;

means for scanning antenna beams of said antenna system;

means for executing a phase-coherent multiplication process of received signals of said main antenna and said sub antenna to output a phase term produced depending on a length of a component of a center-to-center spacing between said main antenna and said sub antenna in the direction of beam scan, a wavelength of a received radio wave and an angle of a radio wave source with respect to a direction of the antenna beams; and means for outputting a signal corresponding to a maximum frequency component corresponding to time-dependent fluctuations of said phase term output from said means for executing a phase-coherent multiplication process, whereby amplitude and phase information about the radio wave source only in the direction of the antenna beams is obtained.

2. An antenna device according to claim 1, wherein said means for scanning antenna beams of said antenna system comprises phase shifters to scan the antenna beams electronically.

3. An antenna device according to claim 1, wherein said means for scanning antenna beams of said antenna system comprises a rotary table to scan the antenna beams mechanically.

4. An antenna device according to claim 1, wherein said antenna system comprises a plurality of said sub antennas, and said means for executing a phase-coherent multiplication process executes an addition of the received signals of said sub antennas, and then a phase-coherent multiplication process of the added total received signal of said sub antennas and the received signal of said main antenna.

5. An antenna device according to claim 2, wherein said antenna system comprises a plurality of said sub antennas, and said means for executing a phase-coherent multiplication process executes an addition of the received signals of said sub antennas, and then a phase-coherent multiplication process of the added total received signal of said sub antennas and the received signal of said main antenna.

6. An antenna device according to claim 3, wherein said antenna system comprises a plurality of said sub antennas, and said means for executing a phase-coherent multiplication process executes an addition of the received signals of said sub antennas, and then a phase-coherent multiplication process of the added total received signal of said sub antennas and the received signal of said main antenna.

* * * * *